Nov. 8, 1955          I E. BRENNER          2,722,746
DENTAL APPLIANCE
Filed July 6, 1954
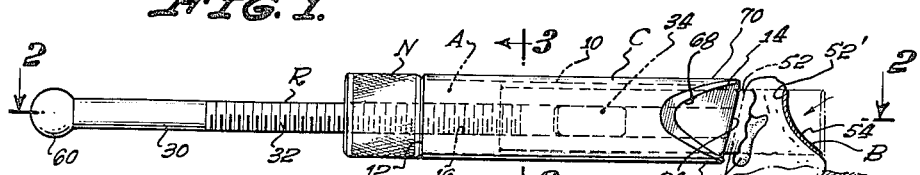
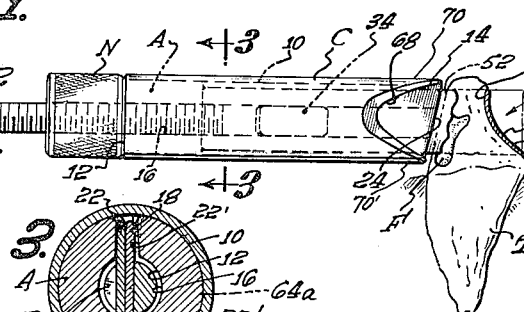
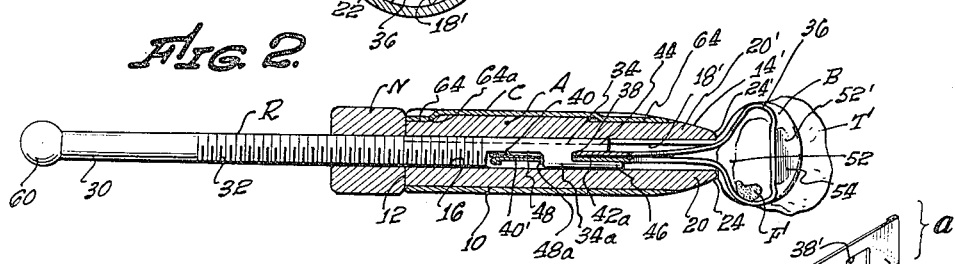
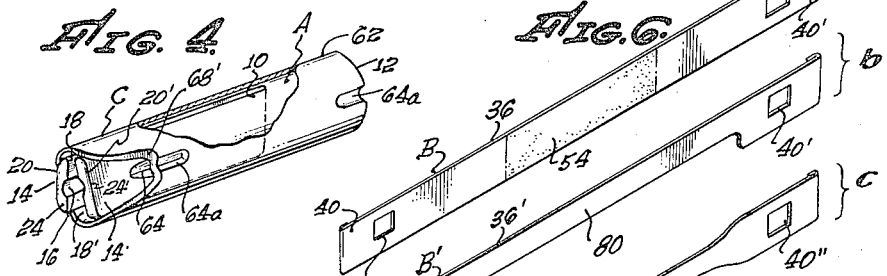
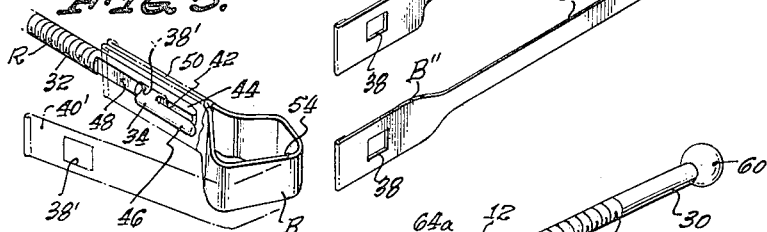
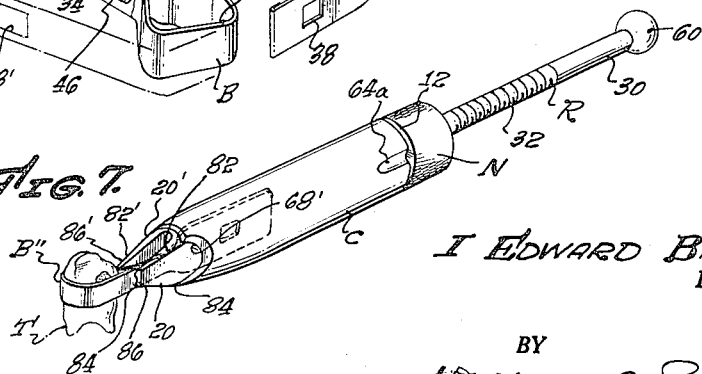
I. EDWARD BRENNER,
INVENTOR.
BY
William C. Babcock
ATTORNEY.

United States Patent Office 2,722,746
Patented Nov. 8, 1955

2,722,746

DENTAL APPLIANCE

I Edward Brenner, Fullerton, Calif.

Application July 6, 1954, Serial No. 441,397

10 Claims. (Cl. 32—63)

The present invention relates generally to the field of clamping devices, and more specifically to an improved matrix holding appliance of the type disclosed and claimed in applicant's co-pending application Serial No. 418,323 entitled A Dental Matrix Appliance, which was filed March 24, 1954, but with the appliance of the present invention and bands utilized in conjunction therewith being particularly well adapted for use on a patient's frontal teeth.

A major object of the present invention is to provide a dental appliance in which elongate bands of varying widths may be removably held in looped position, whereby when a band is so disposed it is capable of encircling a patient's tooth, and at the same time contact substantially all of the desired surface portion thereof.

Another object of the matrix appliance of the present invention is to provide a device of this nature that is particularly adapted for use on those teeth having oppositely disposed surfaces that taper inwardly toward one another above the gum, and one which due to the variable tension that may be placed on a band, ideally serves to maintain the required pressure on an amalgam or plastic filling during the setting period.

Yet another object of the invention is to furnish a dental appliance on which a metallic band may be mounted in a looped position, but from which the looped band may be removed in a more facile manner than possible with the device shown and described in co-pending application, Serial No. 418,323.

A still further object of the invention is to provide a dentist's appliance characterized by the ease and rapidity with which the looped band associated therewith may be drawn into the desired surface contact with a patient's tooth, and which may be just as rapidly disengaged and removed after it has served its purpose.

Yet another object of the present invention is to supply a dental appliance of such structure as to be utilized equally wall in the treatment of adult as well as the smaller teeth of children.

Still another object of the invention is to supply a dental appliance particularly adapted for use with a novel band, which when in a looped position, has a tooth-contacting portion narrower in width than the end portions thereof, which end portions are removably engaged by the appliance.

A further object of the invention is to provide a thin metal band having resilient end portions capable of withstanding appreciable tension-producing forces when applied to localized areas thereof, with these portions supporting an annealed section of the strip therebetween of such ductility that it may be burnished by the application of manual force into surface contact with a tooth.

These and other objects and advantages of the invention will become apparent from the following description of a preferred and alternate form thereof, and from the drawing illustrating those forms in which:

Figure 1 is a side elevational view of the present invention shown supporting a looped band and the manner in which the intermediate portion thereof may be pressed into contact with the rear surface of a tooth from the normal band position as shown in phantom line;

Figure 2 is a horizontal cross-sectional view of the dental appliance shown in Figure 1 taken on line 2—2 thereof;

Figure 3 is a vertical cross-sectional view of the device shown in Figure 1 taken on line 3—3 thereof;

Figure 4 is a fragmentary perspective view of the invention showing the manner in which a cylindrical protective shell may be held in non-rotatable position on the body of the appliance;

Figure 5 is a perspective view of the forward end portion of a rod which is longitudinally movable in the body of the device, illustrating in detail that portion of the rod which removably engages and supports a band in a looped position;

Figure 6a is a perspective view of an elongate band formed with an annealed center portion;

Figure 6b is a perspective view of a first alternate band formed with an upwardly disposed center portion narrower in width than the end portions thereof, which is primarily utilized on children's teeth;

Figure 6c is a prespective view of a second alternate form of band also primarily adapted for use on children's teeth; and Figure 7 is a perspective view of a modified form of the appliance used on children's teeth, and is particularly adapted for use with the band shown in Figure 6c.

Referring now to the drawing for the general arrangement of the present invention, it will be seen that an elongate rod R which is capible of removably engaging and supporting any one of the bands B shown in Figures 6a, 6b and 6c in looped tooth engagement, and is movably supported by a rigid cylindrical body A. An elongate shell C is slidably but not rotatably mounted on the exterior surface of body A, and is moved into a position of band B as a nut N that threadedly engages a portion to prevent the patient's tongue contacting the sharp edges of rod R is rotated to the extent that the nut assumes an abutting position to the end face of the body opposite that from which the looped band extends. Rotation of nut N in an appropriate position when so disposed results in rearward movement of rod R relative to body A, and the desired tension being placed on one of the bands B when in a tooth encircling position as shown in Figures 1 and 2.

The detailed structure of body A may best be seen in Figures 1, 2 and 3. Body A is fabricated from a suitable rigid material such as steel or the like, and is defined by an elongate, cylindrical, longitudinally extending surface 10, an end face 12 circular in transverse cross section, and two forwardly and oppositely disposed extensions 14 and 14' of surface 10 which taper inwardly toward one another. A central bore 16 is formed in body A that extends the length thereof. Two opposing slots 18 and 18' that originate on the end of body A opposite end face 12 thereof, extend inwardly into body A from the top and bottom thereof to communicate with bore 16. Slots 18 and 18' (Figures 1 and 2) do not extend the entire length of body A.

Bore 16 and slots 18 and 18' serve to define two parallel, laterally separated fingers 20 and 20' between which the end portions of band B are disposed when the band is held in the looped position shown in Figure 2. The forwardmost portions of fingers 20 and 20' are formed with two adjacent interior faces 22 and 22' respectively, which taper upwardly and inwardly toward one another as shown in Figure 3. Fingers 20 and 20' each terminate in upwardly and forwardly extending rounded edges 24 and 24' respectively, that are defined at the junctions of surfaces 14 and 14' and faces 22 and 22'.

Rod R as may best be seen in Figure 2 has a plain end portion 30, an intermediately disposed threaded portion 32, and an oppositely disposed end portion 34 in which means are provided to removably engage and support any one of the bands B shown in Figure 6. Each of the bands B is formed from a thin rectangular shaped piece of material 36 that has two angularly shaped openings 38 and 38' disposed inwardly from the ends thereof, with the portions of the strips spaced outwardly from the openings being referred to as tabs 40 and 40'.

The band engaging and supporting means on rod R are provided by forming an axially disposed slot 42 in the end portion 34 thereof, which slot defines two parallel laterally separated legs 44 and 46. A recess 48 slightly longer than one of the tabs 40, 40' is formed in end portion 34 rearwardly from slot 42. Recess 48 is formed in a plane parallel to the plane in which slot 42 is formed. The forward edge 48a of the recess and the rearward edge 42a of the slot are separated by a part 34a of the rod, which part also supports leg 46. The longitudinal length of rod part 34a is slightly less than the lengths of the band openings 38, 38'.

From the above description, and the illustration in Figure 5, it will be seen that a band B may be removably mounted on rod R by forming the band into a loop, and then moving the free end portions inwardly relative to rod R to cause the leg 46 to pass through openings 38, 38'. The tabs 40, 40' during this movement are disposed on the side of rod R on which recess 48 is formed. Movement of the looped band B is continued until further inward movement is prevented by edges of openings 38, 38' contacting edge 42a of the slot. The tabs 40, 40' when such a contact is made tend to straighten out due to the resiliency of the material from which the band is fabricated into alignment with the portion 50 of band B that is not curved, and is situated between openings 38, 38' and the looped part of the band.

In Figure 2 it will be seen that longitudinal movement of the looped band B is impossible when the band is supported in the looped form on rod R, due to the snugness with which tabs 40, 40' fit into the confines of recess 48. Lateral movement of the rod supported portion of band B is likewise impossible, due to the resiliency of tabs 40 and 40', and the fact that the portion 50 of the band is locked between the legs 44 and 46.

With the band B disposed in a looped position on rod R, the band may be disposed to encircle a tooth T as shown in Figure 1 in phantom line that has oppositely disposed upwardly and inwardly extending surfaces 52 and 52'. The band B when tension is applied thereto tends to conform to the upward and inward tapered surface area of the tooth due to the sidewalls 22 and 22' of the body A likewise being tapered in an upwardly and inwardly extending manner as shown in Figure 3.

However, in some instances a tooth may have a most angularly disposed surface portion such as the surface 52' in Figure 1, and to the extent that the band B would not conform thereto even when the band is subjected to considerable tension. In such a situation it has been found desirable to use the form of band B shown in Figure 6a that has a centrally disposed annealed section 54. This annealed section 54 has little or no resiliency, and may be easily burnished and deformed by the application of manually exerted pressure from the position shown in phantom line in Figure 1 to the position shown in solid line in the same figure.

Movement of the rod R in a direction relative to the body A, to place tension on a looped band B, is achieved by rotating the nut N in the appropriate direction, with the nut in an abutting position against the face 12 of the body A. As the nut N is thus rotated, an increasing amount of the band B is drawn into the confines of the slots 18, 18', and the edges 24, 24' of body A are disposed against the forwardly disposed tooth surface as may best be seen in Figure 1.

Rapid movement of the rod R either into or out of the body A is facilitated by providing the unthreaded, outwardly disposed shaft portion 30. When it is desired to remove a looped band B from rod R, the nut is simply spun in a direction to move it from the threaded portion 32 of the shaft to the unthreaded portion 30. Upon the nut reaching the unthreaded portion 30, the nut is slid rearwardly thereon until it contacts a stop 60. The stop 60 may be a ball or other desired body of a greater cross sectional area than that of the rod, which stop is mounted on the extremity thereof as shown in Figures 1 and 2. With the nut N in contact with the stop 60, the rod may be slid forwardly in body A to a position where the tabs 40, 40' may be conveniently disengaged from recess 48, and the band slipped off the rod. Of course, when the appliance is being prepared for use, the above described operation is simply reversed, with the nut N normally being employed to move rod R rearwardly relative to body B only after the band is in a tooth encircling position such as shown in Figures 1 and 2.

In order that the patient's tongue may not inadvertently be cut by contact with the edges of band B, the protective shell C is formed from a rigid tubular member 62 that has guides 64 provided thereon that slidably engage longitudinally projections 64a situated on the exterior surface of the body B. Thus, shell C is longitudinally movable on body A, but cannot rotate relative thereto.

Protective shell C is formed with two oppositely disposed, forwardly situated curved recesses 68, 68' within the confines of which the tapered body surfaces 14, 14' are positioned when the nut N abuts against the end 12 of body A, and band B encircles tooth T. Shell C is of such length, and nut N is sufficiently large in diameter to engage the rear edge of the shell, that when the nut engages body end face 12, the shell has been advanced on the body to dispose an upper and lower extension 70 and 70' thereof in positions to cover slots 18, 18'. In this manner, shell C is automatically disposed on body A in a protective position, when the nut N is rotated sufficiently to place tension on the looped band B.

Upon occasion it is necessary to use a band B on a child's tooth, which is normally considerably shorter than a corresponding adult tooth. The band B' shown in Figure 6b may be employed for this purpose, which band is identical in construction to that of band B except that the central portion 80 thereof is narrower in width than the end portions. The central portion 80 of the band shown in Figure 6b is upwardly disposed relative to the end portions thereof. However, if desired, a band B'' as shown in Figure 6c may be employed on children's teeth that likewise has a narrow central portion 82, but with this portion being in coaxial alignment with the end portions of the band. It will be apparent that the types of band B' and B'' shown in Figures 6b and 6c may have narrow central portions which are annealed or not, depending on the use to which they will be put.

An alternate form of the appliance is shown in Figure 7 that is particularly adapted for use with bands B'' on children's teeth. This alternate form is identical to the preferred form with the exception that the fingers 20, 20' have forwardly and downwardly extending top and bottom edges 82, 82' and 84, 84' that terminate in vertically disposed edges 86, 86' of substantially the same height as the width of band portions 80. The protective shell used in this form of the invention does not have extensions 70 and 70'.

The operation of the invention is extremely simple. One of the bands B, B' or B'' is formed into a loop, with the free end portions thereof in contact with one another, and the openings 38 and 38' in alignment. Rod R is advanced to a position where the forward end thereof projects from body A. The selected type of band is then moved inwardly relative to the rod to pass leg 46 through openings 38, 38', with the tabs 40, 40' disposed on the exterior of the rod, and on the side thereof on which the recess 48 is formed.

After further inward movement of the looped band is prevented by engagement of leg 46 with openings 38, 38', the tabs 40, 40' due to the resiliency of the material from which they are fabricated, immediately snap into recess 48. The resilient tabs at all times tend to assume a position in which they are in alignment with the substantially straight portions of the band positioned forwardly of the body part 34a. Longitudinal movement of the band when thus disposed on rod R is prevented by the snug engagement of the tabs 40, 40' with recess 48. Lateral movement of the rear portion of the looped band is, of course prevented by the part thereof which is situated within slot 42.

With the band so mounted on the appliance, it may be caused to encircle the desired tooth which has upwardly and inwardly extending surface areas as shown in Figure 1, and the band is subjected to tension by tightening the nut N on the threaded rod portion 32. As nut N is rotated, the rod R is drawn toward the nut, but such movement of the rod only occurs when the nut abuts against the body end face 12. When the nut is so disposed, the protective shield C has been advanced on body B to cover the slots 18, 18", and thus prevent injury to a patient's tongue by inadvertent contact with the edges of Band B.

It will be particularly noted that due to the tapered side walls 22, 22' as well as the taper on the forward extremities 24, 24' of body A, that the body A tends to conform to the upward and inward tapered tooth surfaces. When the tooth has a surface area of excessive angle such as 52' in Figure 1, a band B may be employed that has an annealed center portion 54 which may be manually forced by burnishing into contact therewith. Thus, an amalgam filling F such as seen in Figure 1 may be subjected to constant pressure during the time it is setting, by contact with the interior surface of the band.

Band B is removed from rod R by a reversal of the above described procedure. The appliance is not limited to the use of band B, but may also be employed with B' or B" the central portions of which are narrower in width for use on children's teeth.

Although the dental appliance herein described is fully capable of achieving the objects and providing the advantages hereinbefore mentioned, it is to be understood that it is merely illustrative of the preferred embodiments of the invention, and that there is no intention to limit the device to the details of structure thereof other than as defined in the appended claims.

I claim:

1. A dental appliance for use in holding an elongate band formed with two end tabs and openings disposed inwardly therefrom in a looped tooth engageable position which includes: a rod having a recess and first slot formed on one end portion thereof that are capable of removably engaging said openings and tabs when said band is moved inwardly relative to said rod with said tabs and openings in alignment; an elongate body formed with a longitudinally extending bore that movably supports said rod, said body formed with two oppositely disposed second slots that are in communication with said bore and extend inwardly from one end of said body, said second slots and a portion of said bore defining two laterally separated fingers the outer portions of which guide said band into the confines of said second slots as said rod is moved in a direction to place tension on said looped band when it is in a tooth encircling position, and said fingers are disposed substantially normal to said tooth; manually operated means capable of moving said rod relative to said body; and a cylindric shaped shell mounted on said body and of such length as to cover said second slots when said loop is under tension to prevent a patient's tongue or cheek inadvertently contacting the edges of that portion of said band situated within the confines of said body.

2. A dental appliance as defined in claim 1 in which said first slot of said rod extends inwardly from one end thereof and is longitudinally spaced from one end of said recess formed in said rod a distance less than the length of one of said openings for said rod portion so formed to removably support said looped band with said tabs in said recess, with said openings encircling said rod portion disposed between said recess and slot, and with portions of said band situated in said first slot.

3. A dental appliance as defined in claim 1 in which said first slot of said rod is defined by two laterally separated legs and said recess in said rod is disposed inwardly from a junction of said legs less than the longitudinal length of said openings which permits said looped band to be mounted on said rod with said tabs disposed in said recess, said openings engaging that part of said rod disposed between said recess and said legs junction, with a portion of said band between said legs.

4. A dental appliance as defined in claim 1 in which said two laterally separated fingers are formed with upwardly and inwardly tapered adjacent faces and end extremities that are angularly disposed, said adjacent faces and extremities serving to guide said band into the confines of said body as said rod is moved in a direction to place tension on said loop, and to cause said loop to taper upwardly and inwardly when said loop is in a tooth encircling position, and said fingers are disposed substantially normal to said tooth, with said extremities substantially parallel to one surface of said tooth.

5. A dental appliance as defined in claim 1 in which said manually operated means is a nut that rotatably engages a threaded portion of said rod that is spaced inwardly from one end thereof, with a part of said threaded portion disposed within the confines of said body when tension is being maintained on said band, said nut when rotated in a position abutting one end of said body capable of moving said rod in a direction to increase tension on said band, but said nut when rotated in the opposite direction moving outwardly on said threaded portion to an unthreaded portion of said rod to permit said rod to be moved forwardly in said body to a position to conveniently remove said band therefrom.

6. A band for use with a dental matrix appliance of a type in which said band may be so disposed in the form of a loop that the two free end portions thereof may be adjacently situated and capable of being drawn into a forwardly disposed portion of said appliance to forcibly reduce the interior circumferential surface of said loop surface projecting therefrom, including: an elongate substantially rectangular strip of thin resilient deformable sheet steel material having axially aligned elongate rectangular openings formed in the end portions thereof and so situated that an elongate tension-applying area is provided in said strip between the rearwardmost extremities engaged by said appliance, said tension-applying area being sufficiently annealed that it may be manually burnished and deformed by pressure, said strip having tension-resisting areas that extend rearwardly from said tension-applying area of such length and the material forming same of such strength that a predetermined maximum tension may be exerted thereon to cause said tension-applying area to conform to at least a portion of the surface contour of a tooth.

7. A dental appliance for use in holding in a looped tooth engageable position an elongate band that is formed with two end tabs and openings that comprises: an elongate body formed with a longitudinally extending bore; a rod that is movably supported in said bore of said body, said rod having formed on one end portion thereof recess and slot means to removably engage said end tabs and openings of said looped band with said tabs disposed in said recess and with a portion of said band disposed in said slot means; manually operated means capable of moving said rod relative to said body;

and a protective shell mounted on said body to prevent a patient's tongue or cheek inadvertently contacting the edges of that portion of said band that is situated within the confines of said body and rod.

8. A dental appliance for use in holding in a looped tooth engageable position an elongate band that is formed with two end tabs and openings that comprises: an elongate body formed with a longitudinally extending bore; a rod that is movably supported in said bore of said body and being formed with means on one end thereof that removably engage and support said band in the form of a loop upon said band being moved inwardly relative to said rod and in contact therewith in said looped form; manually operated means capable of moving said rod relative to said body; and a protective shell mounted on said body and of such length to prevent a patient's tongue or cheek inadvertently contacting the edges of that portion of said band situated within the confines of said body and said rod.

9. A dental appliance for use in holding in a looped tooth engageable position an elongate band that is formed with two end tabs and openings that comprises: a rod having means formed on one end portion thereof that are capable of removably engaging said end tabs and openings of said looped band; an elongate body formed with a longitudinally extending bore that movably supports said rod, said body formed with two oppositely disposed slots that are in communication with said bore with the adjacent interior faces of said slots tapering upwardly and inwardly towards one another, said slots and a portion of said bore defining two laterally separated fingers the outer portions of which guide said band into the confines of said slots as said rod is moved in a direction to place tension on said looped band, manually operated means capable of moving said rod relative to said body; and a protective shell mounted on said body and of such length as to cover said slots when said looped band is under tension to prevent a patient's tongue or cheek inadvertently contacting the edges of that portion of said band situated within the confines of said body.

10. A dental matrix band that consists of an elongate substantially rectangular strip that is fabricated from resilient steel, having two rectangular openings therein that are longitudinally spaced apart along the longitudinal axis of said band and each of said openings being spaced inwardly from opposite ends of said band the same distance to define elongate tab ends of said band and to define an annealed tension-applying area therebetween, so that when said band is held in tensioned looped tooth-engaging position with said tab ends in contact and said openings in alignment, a portion of said tensioned annealed area will snugly engage a tooth at the gingival seat thereof and be deformed occlusially so that said occlusially deformed area may be manually burnished and deformed by manual pressure to conform to at least a portion of the surface contour of said tooth.

References Cited in the file of this patent
UNITED STATES PATENTS

| | | |
|---|---|---|
| 1,348,257 | Wagner | Aug. 3, 1920 |
| 2,017,955 | Ejde | Oct. 22, 1935 |
| 2,565,598 | Eaton | Aug. 28, 1951 |